(12) United States Patent
Tirapelle

(10) Patent No.: US 7,104,608 B2  
(45) Date of Patent: Sep. 12, 2006

(54) DEVICE FOR ADJUSTING THE POSITION OF AT LEAST ONE MOVABLE PART OF A VEHICLE SEAT

(75) Inventor: Luigi Tirapelle, Settimo Torinese (IT)

(73) Assignee: Isringhausen s.p.a., S. Pietro Mosezzo (IT)

( * ) Notice: Subject to any disclaimer, the term of this patent is extended or adjusted under 35 U.S.C. 154(b) by 160 days.

(21) Appl. No.: 10/479,593

(22) PCT Filed: Jun. 12, 2001

(86) PCT No.: PCT/IT01/00299

§ 371 (c)(1), (2), (4) Date: Dec. 4, 2003

(87) PCT Pub. No.: WO02/100677

PCT Pub. Date: Dec. 19, 2002

(65) Prior Publication Data

US 2004/0174060 A1 Sep. 9, 2004

(51) Int. Cl.  
*B60N 2/02* (2006.01)

(52) U.S. Cl. .................................................. 297/362

(58) Field of Classification Search ............... 297/362; 475/331; 16/221  
See application file for complete search history.

(56) References Cited

U.S. PATENT DOCUMENTS 4,211,451 A     7/1980  Shephard  
5,368,363 A *  11/1994  Sakamoto ................... 297/362  
5,419,219 A *   5/1995  Takizawa ................ 74/665 GA  
5,462,498 A *  10/1995  Lindblad ..................... 475/342  
6,070,938 A     6/2000  Elio  
6,331,034 B1 * 12/2001  Specht ................... 297/362.11

FOREIGN PATENT DOCUMENTS

FR     2141410     1/1973  
GB     2201449     9/1988

* cited by examiner

*Primary Examiner*—Milton Nelson, Jr.  
(74) *Attorney, Agent, or Firm*—Bacon & Thomas, PLLC

(57) ABSTRACT

A device for adjusting the position of a movable part of a vehicle seat. One of two connection elements is secured to the movable part and to the other connection element for rotation about a first axis. A lever mechanism selectively either allows the one connection element to rotate or locks it in a selected angular position. The lever mechanism includes circular toothing around an aperture in the one connection element, at least two gears engaging said toothing and movable with planetary motion about the first axis, and levers arranged to shift the gears between a first position in which they are engaged with each other and with the toothing to prevent rotation of the one connection element and a second position in which the gears are engaged only with the toothing to enable rotation of the one connection element.

20 Claims, 5 Drawing Sheets

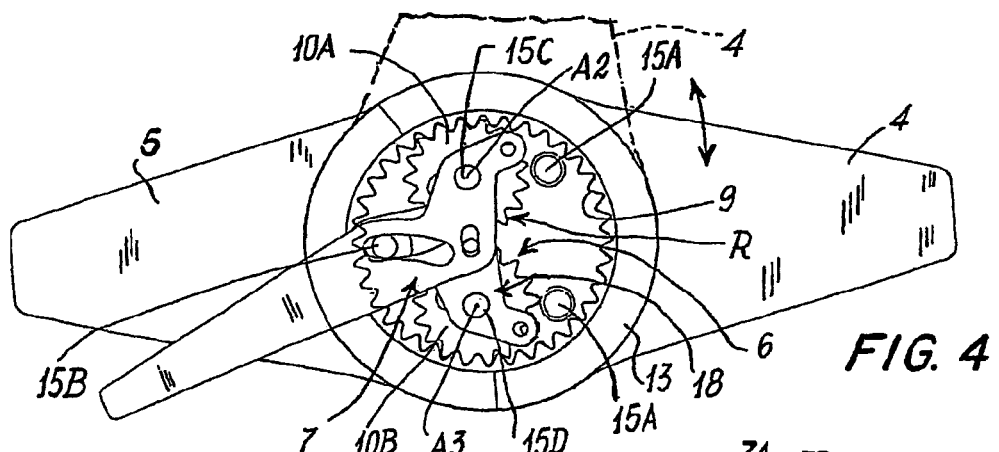
FIG. 4
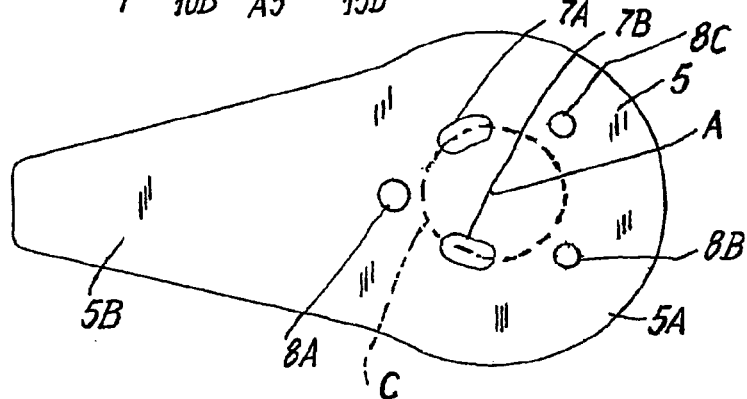
FIG. 6
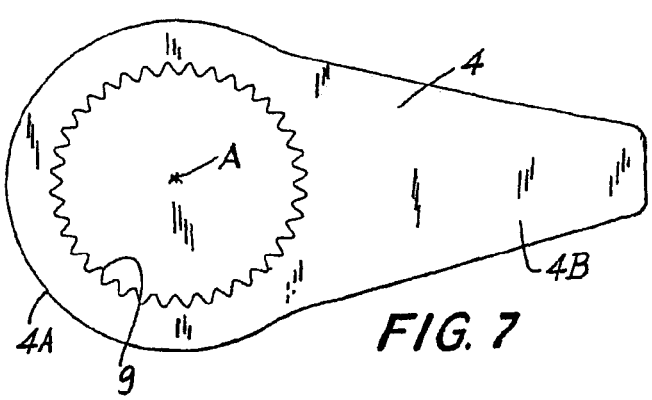
FIG. 7
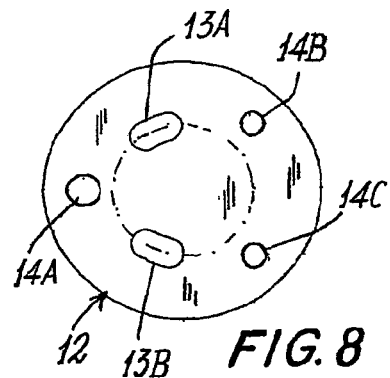
FIG. 8
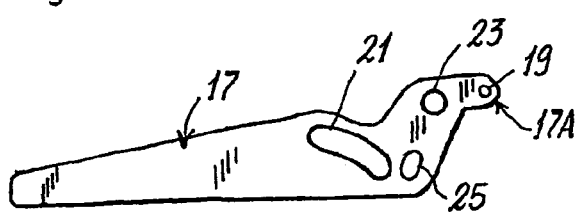
FIG. 9
FIG. 10

US 7,104,608 B2

DEVICE FOR ADJUSTING THE POSITION OF AT LEAST ONE MOVABLE PART OF A VEHICLE SEAT

CROSS-REFERENCE TO RELATED APPLICATIONS

This application is a National Phase Application (35 USC 371) of PCT/IT01/000299 filed Jun. 12, 2001.

BACKGROUND OF THE INVENTION

1. Field of the Invention

The present invention relates to a device for adjusting the position of at least one movable part of a vehicle seat, in particular the position of its seat back relative to its seat cushion.

2. The Prior Art

Known devices for adjusting the position of the seat back relative to the seat cushion, if using gears with planetary motion (see for example US5704870 or US42111451 or EP0332340), generally comprise a large number of components of difficult and complicated construction and assembly, which largely influence the final device production costs.

It also often happens that, with use, radial slack arises between the components of known devices, causing a decline in the quality and accuracy of the seat adjustment, and in the long term leading to a deterioration in the device itself.

SUMMARY OF THE INVENTION

An object of the present invention is to provide a device for adjusting the position of at least one movable part of a vehicle seat, in particular the position of its seat back relative to its seat cushion, which comprises a small number of components of simple construction and rapid assembly, and ensures an absence of radial slack between its components.

BRIEF DESCRIPTION OF THE DRAWINGS

The present invention will be more apparent from the accompanying drawings, which are provided by way of non-limiting example and in which:

FIGS. 3 and 4 are front schematic views thereof, which are taken in the same manner as FIGS. 1 and 2, but in which a component of the device is omitted in order to show the positioning of the gears in the two different operating positions.

DESCRIPTION OF THE PREFERRED EMBODIMENTS

Figure 1:
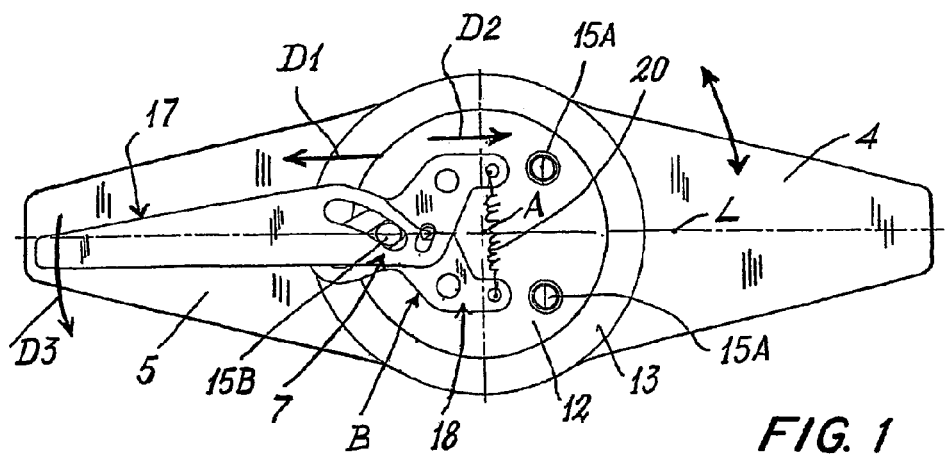
FIGS. 1 and 2 are a front schematic view of a device according to the invention in two different operating positions.
Figure 2:
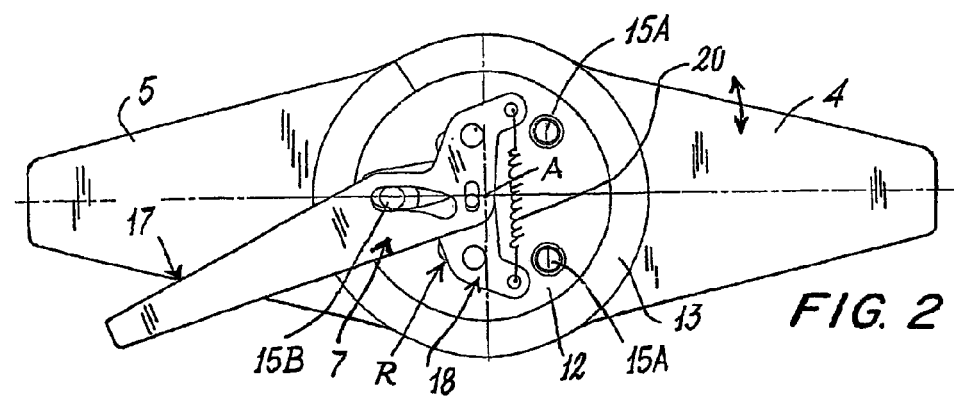

With reference to said figures, the device of the invention is arranged to adjust the relative position of two movable parts of a vehicle seat 1 (FIG. 1I A), in particular the device being arranged to adjust the inclination of the seat back 2 to the seat cushion 3. The device comprises: two plate elements (connection elements) 4, 5, positioned one in front of the other and secured to the support frames 3A, 2A of the seat cushion 3 and seat back 2, connector means 6 for connecting the two elements 4, 5 together so as to enable one of said elements to rotate relative to the other about a first axis A1 (FIG. 5A), and control means 7 by which said element 4 is enabled to rotate or, alternatively, be locked in a preferred position. More specifically, the two plate elements 4 and 5, shown in FIGS. 6 and 7, are both of the same shape in the illustrated example and comprise respective circular parts 4A, 5A from which extend arms 4B, 5B to be rigidly fixed, in conventional manner, to the respective frames of the relative device support structures.

Figure 11A:
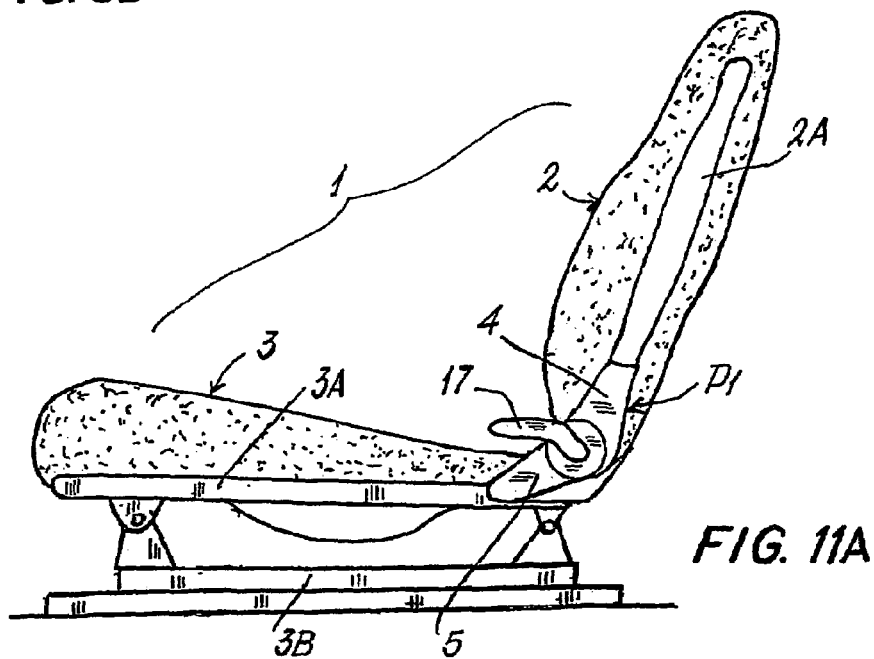
FIGS. 11A, 11B, 11C, 11D, 11E are side schematic views of a seat comprising a device of the invention associated with the seat in the form of different variants and in different positions of utilization.

The plate element 5 is that to be fixed to the frame 3B of the cushion 3 of the seat and, in the embodiment of FIG. 11A, is unable to rotate and can only translate together with the seat. As seen in FIG. 6, this fixed element 5 presents two slots 7A, 7B disposed spaced apart along the same circumference C concentric with the centre of rotation A of the two plate elements, and three through holes 8A, B, C.

Figure 3:
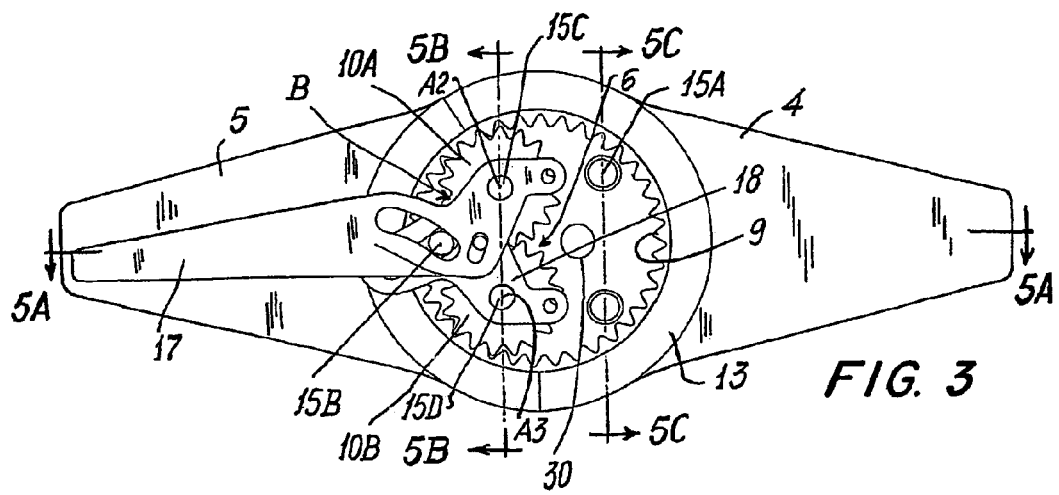
Figure 5A:
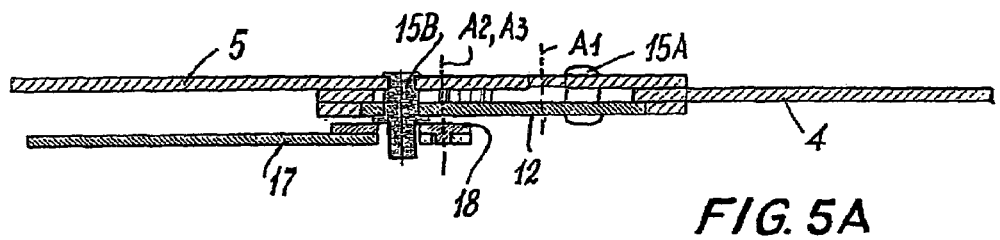
FIGS. 5A, 5B, 5C are schematic sections taken on the lines AA, BB and CC of FIG. 3, FIGS. 6–10 are front schematic views of some of the components of the device.

The other plate element 4 is that to be fixed to the frame 3A of the seat back in the embodiment shown in FIG. 11A. When released from the seat, this element 4 can rotate through 360° about the other plate element, on an axis of rotation A1 (FIG. 5A) perpendicular to the plate elements and concentric with the circular parts 4A, 5A of these elements. As shown in FIG. 7 the element 4 presents in its circular part 4A a circular aperture having teeth 9 along its edge and concentric with the centre of rotation A of the two plate elements and with the axis of rotation A1 of the element 4. As shown in FIGS. 3 and 4 two gear wheels 10A, 10B are arranged to engage teeth 9 and to move with planetary motion, i.e., each with a rotary movement about its respective axis A2, A3 (FIG. 5) and a simultaneous rotary movement about the axis A1 which passes through the centre A of the circular aperture 9 and represents the axis of rotation of the fixed other element 5. The two axes of rotation A2, A3 are parallel to and equidistant from the axis A1 and are hence also perpendicular to the elements 4, 5.

The gear wheels 10A, 10B and the toothing (teeth) 9 are substantially conventional and are shaped such as to enable the gear wheels 10A, 10B to engage with each other and with the toothing 9 (FIG. 3), to lock the two plate elements 4 and 5 together in a preferred position, or alternatively to engage the toothing 9 but not with each other (FIG. 4), to enable the movable element 4 to rotate about the fixed element 5. The gear wheels 10A, 10B always maintain a complementary position one to the other and to the toothing 9, so as to always be able to engage each other when changed from the state in which they are not in mutual contact to the state in which they are in mutual contact.

Advantageously, the gear wheels 10A, 10B have the same thickness as the movable element 4, so as to be housed within the element 4 with their bases resting, respectively, against one face of the fixed plate element 5 and against one face of a discoidal retention element or disc 12 (FIG. 5B) maintained in position by an annular element 13 rigidly fixed, for example by welding, to the movable plate element 4 or formed in one piece with that element. The disc 12 has a greater diameter than the toothed aperture of the element 4 so that the disc 12 rests at least partly on the element 4. As shown in FIG. 8, the disc element 12 presents two slots 13A, 13B and three through holes 14A, 14B, 14C, these being positioned and shaped identically to 7A, 7B, 8A, 8B and 8C in the plate element 5. The annular element 13 prevents radial movement (slack) of the disc 12 and maintains concentricity of the various device components. The disc 12 is rigidly fixed to the plate element 5 by two connection members 15A and one connection member 15B (FIG. 4), for example of the nut and bolt or rivet type, passing through the holes 8A, 8B and 8C of the plate element 5 and 14A, 14B and 14C of the disc 12, the first two members 15A (FIG. 5C) comprising a central portion T having the same thickness as the element 4 so as to axially secure the disc 12 to the fixed plate element 5 at a predetermined distance apart. The other member 14 also acts as a fulcrum for two levers 17, 18 described in detail hereinafter (FIG. 5A) by which the device is operated. It should be noted that the diameter of these pins is slightly less than that of the holes 8A, 8B and 8C so that they are housed with slight radial slack in these holes.

The movable plate element 4 is "hinged" to the plate element 5, in the sense that the movable element 4 can only rotate about the axis A1 (FIG. 5A) passing through the centre of the elements 4, 5, 12, 13, because axial movement of element 4 is prevented by the connection between the disc 12 and the fixed element 5 and the fact that the disc 12 rests on the movable element 4, and radial movement of element 4 is prevented by the cooperation between the annular element 13 and the disc 12.

Figure 5B:
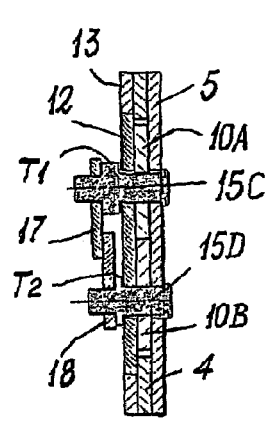
Figure 5C:
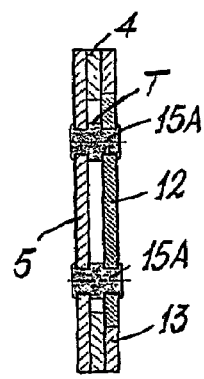

As shown in FIG. 5B, the gear wheels 10A, 10B are connected to the fixed disc 12 and to the fixed plate element 5 by connection members 15C, 15D engaging in the slots 7A, 7B and 13A, 13B, so as to allow rotation about the respective axes A2, A3. The members 15C, 15D also act as rotation pins for the device operating levers 17, 18 and comprise portions T1, T2 which serve to space these levers from each other and from the fixed disc 12.

The control means 7, by which the plate element 4 is enabled to rotate or, alternatively, be locked in a preferred position, comprises a lever system for shifting the gear wheels 10A, 10B between a first position B for device locking (FIGS. 1 and 3), in which they are engaged with each other and with the circular toothing 9, and a second position R for device adjustment, in which the gear wheels are engaged only with the circular toothing 9. For this purpose, the control means 7 comprises the control lever 17 and the auxiliary lever 18, both pivoted on the pin 15B (FIG. 5A). The levers 17 and 18 present respective semicircular slots 21, 22 (FIGS. 9 and 10) for passage of the pivot pin 15B, a hole 23 for passage of the pins 15C, 15D (FIG. 5B) fixed to the gear wheels 10A, 10B, and a hole 19 for connecting the ends of the levers to an elastic member 20 (FIGS. 1 and 2), for example a spring, arranged to urge the ends 17A and 18A of the two levers 17, 18 towards each other. The two levers are also connected together by a pin 24 (FIG. 10) extending from the auxiliary lever 18 and arranged to engage in a slot 25 in the control lever 17. The two levers 17, 18 cannot move axially as they are retained by rivets or bolts (not shown) engaging the connection pins 15B, 15C, 15D, and can therefore only rotate about the pin 15B. However, as the pin 15B is engaged in the slots 21, 22 (FIGS. 9, 10) and the pins 15C, 15D are engaged in the slots 7A, 7B 13A, 13B of the element 5 and the element 12, respectively, on rotating the control lever 17 the two levers 17, 18 can translate parallel to the plates 4 and 5 (as shown in FIGS. 1–4).

It should be noted that during operation of the lever system, the rotation pins of the gear wheels 10A, 10B always remain equidistant from the pivot pin 15B of the lever system.

The two slots 21 and 22 are shaped specular to each other about the longitudinal axis L (FIG. 1) of the fixed plate element 5. The slots 21 and 22 of levers 17 and 18, and the slots of elements 5 and 12 are shaped such that, when the lever system is in its rest position B (FIGS. 1 and 3), the action of the spring 20 urges the lever arms carrying the gear wheels 10A, 10B into engagement with each other and with the internal toothing 9 of the movable plate element 4, to securely lock the movable element 4 to the element 5 and thereby prevent rotation of element 4. When in this position the gear wheels 10A, 10B, by the force of the spring 20 are pressed against the circular toothing 9 to thereby eliminate any possibility of slack between the movable plate element 4 and the fixed plate element 5 during rotation.

It should also be noted that the levers 17, 18 are shaped such that when in their rest position (FIGS. 1, 3), the spring 20 exerts, on the pivot pins 15B (FIG. 5A) and on the pins 15C, 15D, 15A (FIGS. 5C, 5D), which connect the disc 12 to the plate 5, a force directed along the longitudinal axis L (FIG. 1) of the plate element 5 and operating to move these pins a few millimeters towards the movable element 4, and hence also move the disc 12 against the annular element 13 at the point indicated by C in FIG. 1. By virtue of the contact between the disc 12 and ring 13 (FIG. 1) the fixed plate element 5 is put under tension against the movable plate element 4, thus eliminating any slack between the two elements. Consequently the lever system, when in its rest position in which it locks the movable plate 4, securely fixes together the plate 4 and the fixed plate 5, eliminating any possible slack between the two plates, by virtue of a double thrust action exerted on the gear wheels 10A, 10B in a first direction D1 (FIG. 1), and on the combined gear wheels, guide plate 12 and movable plate 4 in a second direction D2, opposite the first. It should be noted that the pins 15A, 15B, 15C, 15D can be shifted by the lever system because they are engaged in holes in the plate 5 and disc 12 which are larger. If instead the lever 17 is pushed downwards (direction D3 FIG. 1) the lever system 7 is put into the adjustment position, enabling the movable plate 4 to rotate. In this respect, the lowering of the lever 17, together with the other lever 18, translates coaxially to the longitudinal axis of the fixed plate (in the direction D2 FIG. 1) to also drag by this movement the gear wheels 10A, 10B pivoted into engagement with the levers, to withdraw them from mutual engagement so that they no longer obstruct each other but however remain in contact with the internal circular toothing 9 of the movable plate 4 along which they rotate during this movement. Hence on lowering the lever 17 the plate element 4 can be freely rotated to any angular position about the fixed element 5. During the rotation of the plate 4 the gear wheels 10A, 10B are rotated by the toothing 9. The translation of the levers 17, 18 and of the gear wheels 10A, 10B is guided and limited by the slots 7A, 7B and 13A, 13B provided in the fixed plate 5 and in the disc 12. It should be noted that the slots 7A, 7B 13A, 13B maintain the rotation axes A2, A3 of the gear wheels 10A, 10B equidistant from the central rotation axis A1 of the movable element 4 during the "release" movement of the gear wheels. This is ensured by the fact that the slots extend along a circular arc concentric with toothing 9. Moreover, when the lever 17 is lowered, a thrust coaxial to the longitudinal axis L is no longer exerted on the pivot pin 15B, and hence a slight slack is created between the fixed plate 5 and movable plate 4. This slack is however not detrimental during this adjustment stage of the inclination of the movable plate 4.

By virtue of the pin 24 (FIG. 10) of the auxiliary lever 18 and its engagement in the slot 25 of the control lever 17, movement is transmitted from the lever 17 to the lever 18 with symmetry about the longitudinal axis L of the plate element 5. The slot 25 enables take-up of any slack between the gear wheels 10A, 10B when these are required to engage each other and the toothing 9. This simplifies the construction of the gear wheels of the device, which do not need to be constructed with great precision. Proper operation of the device is therefore possible even if the teeth of the toothing are not formed accurately. In the device of the invention the toothings in fact operate to provide a wedging action when locking the two elements 4 and 5 together, and to merely drag the gear wheels 10A, 10B during rotation of the element 4.

The device of the invention overcomes many of the drawbacks present in known devices. In this respect, using a very small number of components of simple construction and assembly, the device of the invention enables the movable element 4 to be adjusted continuously through an angle of 360° rather than stepwise relative to the fixed element 5, without any slack or any decline in the position of the seat back relative to the seat cushion once the two elements 4 and 5 have been locked together. Moreover, as the device of the invention does not involve rotating the plate 4 in steps, it operates perfectly even for very small movements.

Figure 11B:
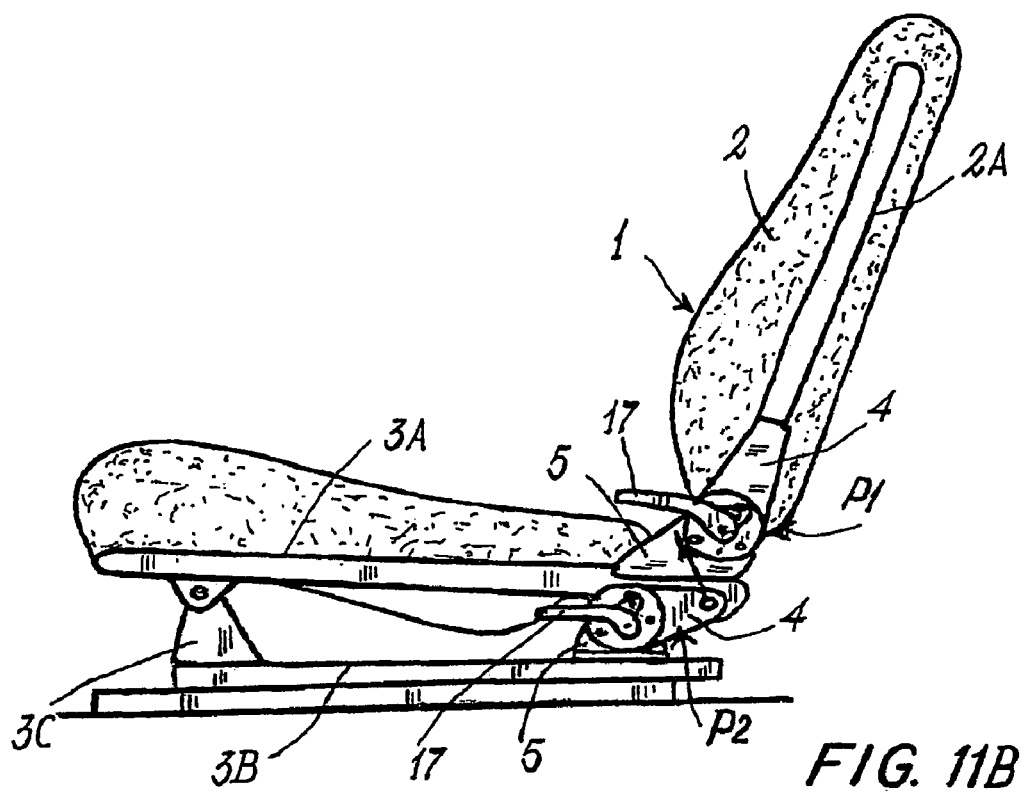
Figure 11C:
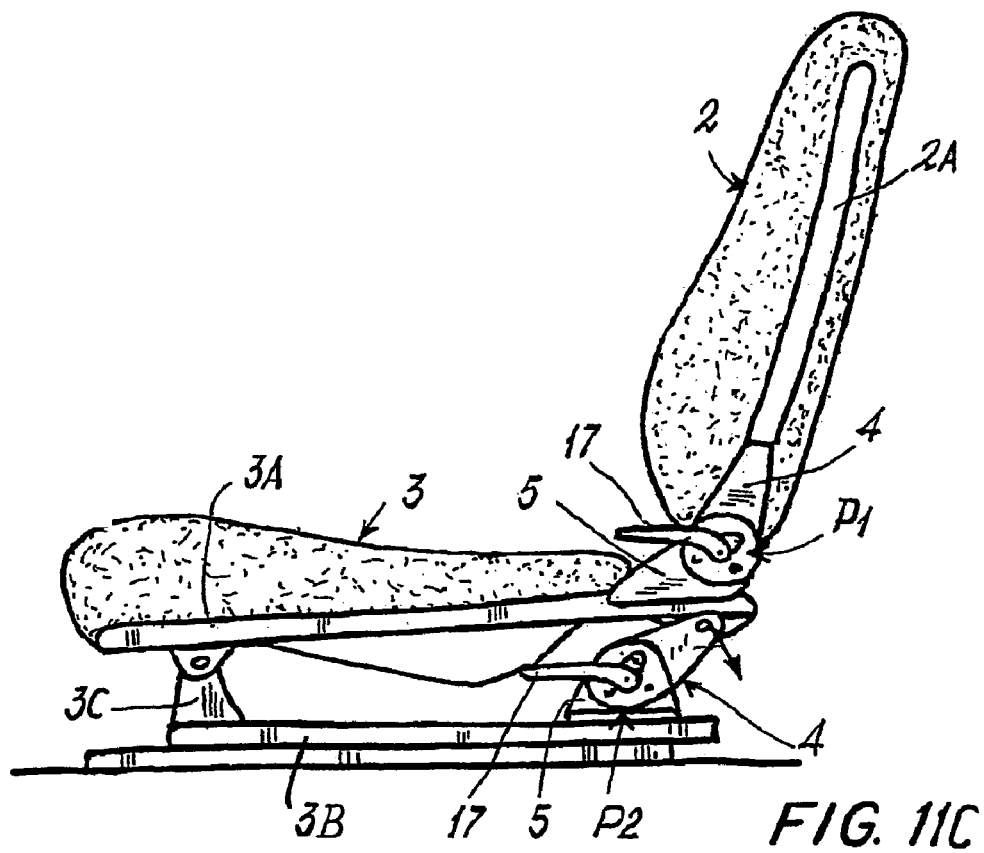

FIGS. 11A–11E show some possible ways of using the device. In FIG. 11A the device is used only for adjusting the inclination of the seat back 2, reference having been made to this application in the foregoing description. FIGS. 11B and 11C show the use of a first device of the invention (indicated by P1) for adjusting the inclination of the seat back 2 as in the preceding application, and of a second device of the invention (indicated by P2) for raising the seat cushion. In this latter application the movable plate 4 of the device P2 is secured to that end of the frame 3A of the seat cushion 3 hinged to the seat back by the device P1, whereas the fixed part of the device P2 is secured to the usual slidable frame 3B which enables the seat to slide horizontally. The other end of the frame 3A of the seat cushion is hinged to a support 3C also rigidly secured to the horizontally slidable frame 3B of the seat. With the device P2, by acting on the operating lever 17, the seat cushion can either be locked in a desired position or its position varied by rotating the rear part of the seat cushion about its front part (as shown in FIGS. 11B, 11C). The device P2 is advantageously provided on the side of the seat opposite that on which the device P1 is positioned.

Figure 11D:
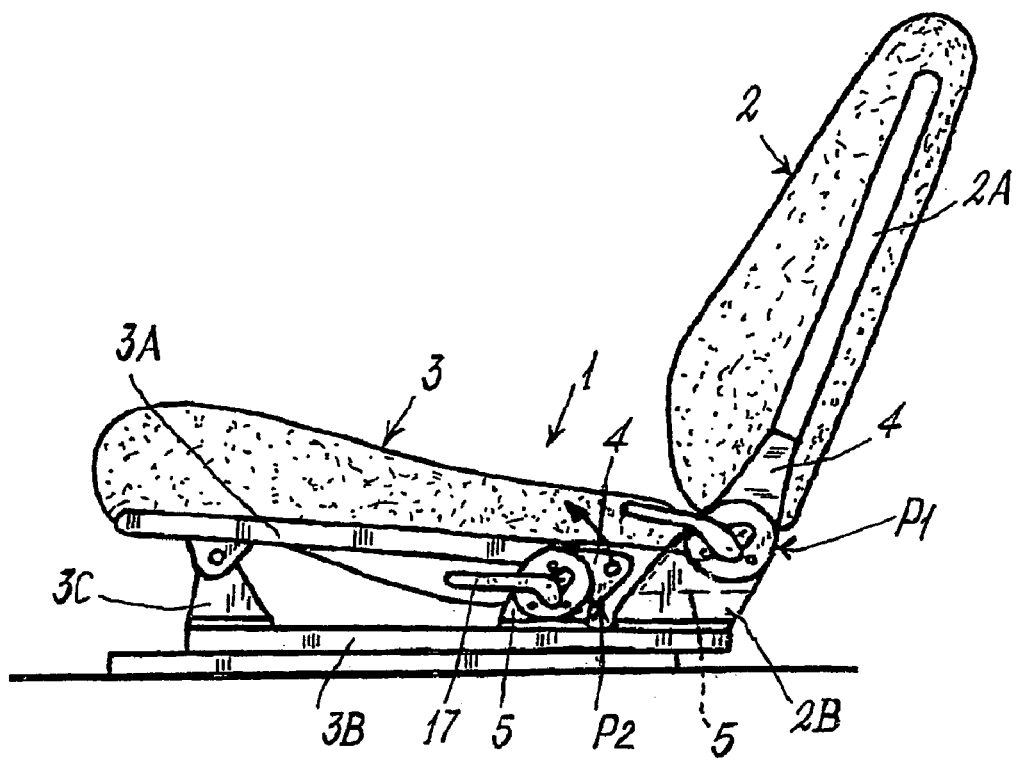
Figure 11E:
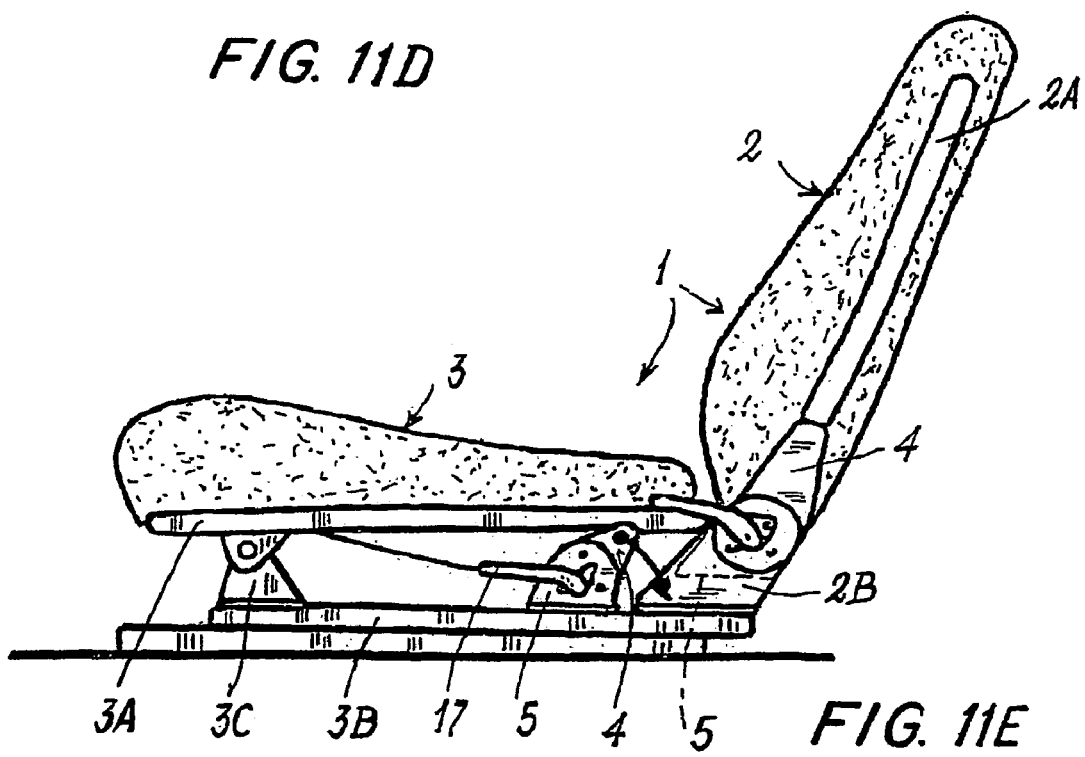

FIGS. 11D, 11E show an arrangement in which two devices P1, P2 of the invention are again provided; in a first device P1 the movable element 4 is again secured to the frame 2A of the seat back as usual, whereas the fixed element 5 is secured to a plate 2B rigidly fixed to the frame 3B for the horizontal sliding of the seat and not to the seat cushion. This latter is free from the seat back and is connected at its front to the frame 3B for the horizontal sliding of the seat by a support 3C to which it is hinged, and at its rear by the second device P2, the movable part 4 of which is secured to the frame 3A of the seat cushion, whereas its fixed part 5 is secured to the seat frame 3B. In this application of the device it is used both to adjust the inclination of the seat back 2 and to adjust the inclination of the seat cushion 3 (as shown in FIGS. 11D, 11E which show two different positions of the seat cushion).

The device of the invention could also be used by utilizing the rotation of both the plate elements 4 and 5, for example by hinging at least one of the ends of these elements to a block slidable horizontally along a guide, while maintaining the other end fixed and connecting the movable part of the seat to a pin, for example passing through a hole 30 (FIG. 3). This further variant the device can be used, for example, to vary the height of a part of the seat cushion secured to the pin passing through the hole 30. In this variant, both the connection elements 4 and 5 rotate and translate horizontally. As the device enables the movable element 4 to be rapidly and stably moved angularly through 360°, it is particularly suitable for all those applications which require the seat back to undergo a "table" or "bed" movement.

Finally, it should be noted that the afore described embodiment has been provided by way of example only, and that numerous variants are possible all falling within the same inventive concept. For example the lever system 7 could be of type different from that illustrated provided it is able to lock the gear wheels 10A, 10B together and to the toothing 9, while at the same time putting the plates 4 and 5 under mutual tension to eliminate slack between said plates, or alternatively to enable the plate 4 to rotate and the lever system, once released, to return to its locking position.

For example the lever system could employ a "scissor" action which would require only the prolongation of the end 18B (FIG. 10) of the auxiliary lever 18.

Again, the gear wheels 10A, 10B could consist of toothed circular sectors if desired to limit the rotation of the plate 4. Likewise, the circular toothing 9 could extend only through an arc of a circle. Hence in the present context semicircular toothings and wheels are also included within the concept of circular toothing and gear wheels.

In a manner totally obvious to the expert of the art, the number of gear wheels 10A, 10B could also be increased, for example to four. The shape of the parts 4B and 5B (FIGS.

6 and 7) could also be different from that shown, in order to make these parts more easily fixable to the seat support structures.

The invention claimed is:

1. A device for adjusting a position of at least one movable part of a vehicle seat comprising:
   first and second connection elements, for connecting of at least the first connection element to a movable part of the seat;
   connector means for connecting the first and second connection elements together so as to enable at least the first connection element to rotate about a first axis of rotation;
   control means for selectively either allowing the first connection element to rotate or locking the first connection element in a preferred angular position, said control means comprising:
   at least partly circular toothing provided around an aperture in the first connection element;
   at least two gears engaging with said toothing and movable with planetary motion about the first axis of rotation; and
   a lever system for shifting gears between a first position in which the gears are in engagement with each other and with the toothing, preventing rotation of the first connection element, and a second position in which the gears are in engagement only with the toothing and wherein the first connection element is free to rotate, the lever system maintaining the gears always in mutually complementary positions enabling the gears to engage with each other when the gears pass from the first position to the second position.

2. A device as claimed in claim 1, wherein the lever system comprises at least two levers and means, including at least one elastic member, for connecting the levers together and to the connection elements, for biasing the gears against the toothing, and for maintaining tension between the gears and the toothing and between the first and second connection elements when the gears are in the first position, thereby preventing slack between the first and second connection elements.

3. A device as claimed in claim 1, wherein the first and second connection elements are plate elements, are positioned in two mutually parallel planes and comprise respective circular portions which are coaxial with each other and with the first axis of rotation.

4. A device as claimed in claim 1, wherein the first connection element is a plate element presenting an at least partly circular aperture, and wherein an edge of the plate element surrounding the aperture is provided with an at least partly circular toothing concentric with the first axis of rotation.

5. A device as claimed in claim 4, wherein the gears have the same thickness as the element having the circular toothing.

6. A device as claimed in claim 5, wherein the gears are retained axially on one side by a portion of one face of the second connection element and on the other side by a discoidal element rigidly secured axially to and spaced from the second connection element.

7. A device as claimed in claim 6, wherein the first connection element includes an annular element for radially retaining the discoidal element.

8. A device as claimed in claim 1, wherein the gears are gear wheels.

9. A device as claimed in claim 1, characterized in that the means which enables the first connection element to rotate comprises a discoidal element secured axially to the second connection element and having a face at least partially in contact with the first connection element, the first connection element including an annular element in which the discoidal element is seated so as to prevent radial movement of the discoidal element.

10. A device as claimed in claim 1, wherein the lever system comprises a first control lever and at least one auxiliary lever rotatable about a common pivot pin.

11. A device as claimed in claim 10, wherein the common pivot pin is engaged within an arc-shaped aperture provided in each of the levers and shaped so as to force the levers, during their rotation about the common pivot pin, to also undergo simultaneous translation along a direction (L) parallel to planes in which the first and second connection elements lie.

12. A device as claimed in claim 11, wherein the arc-shaped apertures are shaped so as to at least partially shift the common pivot pin, when the lever system shifts the gears into the first position which prevents rotation of the second connection element, thereby putting the first and second connection elements under tension and locking them rigidly together.

13. A device as claimed in claim 11, wherein the gears are fixed to respective gear rotation pins engaged within arc-shaped apertures formed within the second connection element, said arc-shaped apertures extending along circumferences which have the same diameter and concentric with the first axis of rotation of the first connection element.

14. A device as claimed in claim 1, wherein the lever system comprises at least first and second levers rotatable about a common pivot pin and wherein the gear rotation pins remain equidistant from the common pivot pin in shifting between the first and second positions.

15. A device for adjusting a position of at least one movable part of a vehicle seat comprising:
   first and second connection elements, the first connection element being for connection to a movable part of the seat;
   connection means for connecting the first and second connection elements together so as to enable relative rotation about a first axis of rotation; and
   control means for selectively allowing the first connection element to rotate or to be locked in a preferred angular position;
   wherein the control means comprises:
   an at least partially circular aperture in the first connection element with an at least partly circular toothing around the aperture;
   at least two gears engaging with the toothing and movable with planetary motion about the first axis of rotation; and
   a lever system for shifting gears between a first position in which the gears are engaged with each other and with the toothing to prevent relative rotation of the first and second connection elements, and a second position in which the gears are engaged only with the toothing to allow relative rotation of the first and second connection elements, the lever system, the gears and the toothing being arranged to maintain the gears always in mutually complementary positions which enable the gears to engage with each other when the gears are shifted from the first position to the second position.

16. A vehicle seat comprising at least one movable part and at least one adjustment device for adjusting the at least one movable part, said adjustment device comprising:
- first and second connection elements, for connection of at least the first connection element to a movable part of the seat;
- connector means for connecting the first and second connection elements together so as to enable at least the first connection element to rotate about a first axis of rotation;
- control means for selectively either allowing the first connection element to rotate or locking the first connection element in a preferred angular position, said control means comprising:
- at least partly circular toothing provided around an aperture in the first connection element;
- at least two gears engaging with said toothing and movable with planetary motion about the first axis of rotation; and
- a lever system for shifting gears between a first position in which the gears are in engagement with each other and with the toothing, preventing rotation of the first connection element, and a second position in which the gears are in engagement only with the toothing and wherein the first connection element is free to rotate, the lever system maintaining the gears always in mutually complementary Positions enabling the gears to engage with each other when the gears pass from the first position to the second position.

17. A vehicle seat as claimed in claim 16, wherein the one movable part is a back of the seat and wherein the first connection element is connected to a frame of the back of the seat, the second connection element being connected to a frame of a cushion of the seat.

18. A vehicle seat as claimed in claim 16, wherein the movable part of the seat is an upper frame of the seat to which a seat cushion and the first connection element are fixed, with the second connection element being connected to a lower frame of the seat, the upper and lower frames being hinged together at a front side.

19. A vehicle seat as claimed in claim 16, wherein the movable part of the seat is a frame of a back portion of the seat, and wherein the second connection element is connected to a frame member secured to a lower frame beneath a seating portion of the seat.

20. A vehicle seat as claimed in claim 16, wherein the movable part of the seat to which the first connection element is secured is an upper frame of a seating portion of the seat, the second connection element being connected to a lower frame of the seating portion, the upper and lower frames being hinged together at a front side.

* * * * *